(12) United States Patent
Johnson et al.

(10) Patent No.: US 6,342,914 B1
(45) Date of Patent: Jan. 29, 2002

(54) FILM REGISTRATION SLIDES

(75) Inventors: Benjamin A. Johnson, Woodbury; Brian D. Nelson, Saint Paul, both of MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/649,276

(22) Filed: Aug. 28, 2000

(51) Int. Cl.⁷ .................................................. B41J 2/435
(52) U.S. Cl. ....................................... 347/262; 347/264
(58) Field of Search ................................ 347/264, 262; 346/138, 125, 107.6; 358/493, 494; 271/243, 226, 230, 245

(56) References Cited

U.S. PATENT DOCUMENTS 4,750,045 A  * 6/1988  Ohara et al. ................. 358/494
5,956,071 A    9/1999  Mattila et al. ............... 347/262

\* cited by examiner

*Primary Examiner*—Hai C. Pham
(74) *Attorney, Agent, or Firm*—William F. Noval

(57) ABSTRACT

An apparatus for registering film in a drum scanner assembly including; a concave curved film platen having spaced first and second linear edges that are oriented horizontally and third and fourth curved side edges connected between the first and second edges, the concave, curved film platen having a curved surface defining a curved film path having a first downwardly curved position and a second upwardly curved position from the first to the second edges, first and second spaced film engagement assemblies independently and movably mounted relative to the platen at the second portion of the film path, the assemblies having film registration slides for engaging the leading edge of a sheet of film fed onto the concave, curved film platen from the first edge and along the curved film path the slides being mounted for movement over substantially the length of the second portion of the path and being adapted to register films of different lengths; and device associated with the slides for biasing the slides through the force of gravity against the leading edge of the film, wherein as the film is fed along the curved path, the slides are moved upwardly by the film against the force of gravity wherein the film is caused to conform to the curved film platen and wherein the independently mounted slides act to remove skew from the fed film.

9 Claims, 17 Drawing Sheets

FILM REGISTRATION SLIDES

FIELD OF THE INVENTION

This invention relates in general to internal drum scanner assemblies and laser imaging systems incorporating such scanner assemblies. In particular, the present invention relates to a mechanism for aligning film into a scanning position in an internal drum type scanner assembly, suitable for use in a medical imaging system.

BACKGROUND OF THE INVENTION

Laser imaging systems are commonly used to produce photographic images from digital image data generated by magnetic resonance (MR), computed tomography (CT) or other types of medical image scanners. Systems of this type typically include a continuous tone laser imager for exposing the image on photosensitive film, a film processor for developing the film, and control subsystems for coordinating the operation of the laser imager and the film processor.

The digital image data is a sequence of digital image values representative of the scanned image. Image processing electronics within the control subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors) for exposure of the image onto the film. The linear translation system provides for movement of the laser scanning system in a direction perpendicular to the scanning direction, such that a full image may be scanned on a piece of photosensitive film.

In an internal drum type laser scanner assembly, a piece of film is positioned onto a film platen, wherein the film platen has a partial cylindrical or partial drum shape. The photosensitive film is positioned against the film platen. The laser or optical scanning system is positioned at the center of curvature of the photosensitive film for scanning a scan line across the photosensitive film surface. A linear translation system moves the laser or optical scanning system lengthwise along a longitudinal axis as defined by the center of curvature of the film to expose an entire image onto the film.

The film may be fed onto the film platen utilizing a film transport system which often incorporates a plurality of feed rollers. Once the piece of photosensitive film is fed onto the film platen, the film must be held tight against the curved surface of the film platen, and centered and aligned into a scanning position in order for an image to be correctly exposed onto the photosensitive film. Any skew of the film must also be removed. Often such methods and mechanisms for aligning and centering a piece of film on the internal surface of the film platen require multiple complex mechanical and electrical components and control systems.

U.S. Pat. No. 5,956,071, issued Sep. 21, 1999, inventors Mattila et al., discloses an assembly for positioning a film into a scanning position on a curved film platen in an internal drum scanner assembly. The film platen is defined by a first curved edge, a second curved edge, a film feed edge, and a film stop edge. The assembly comprises a first slider block assembly and a second slider block assembly which is spaced from the first slider block assembly a distance less than the width of the leading edge of the photosensitive film. A feed mechanism is positioned proximate the film feed edge, for feeding a piece of photosensitive film having a leading edge along the curved film platen. The leading edge of the film is fed from a location proximate the film feed edge towards the film stop edge. When the photosensitive film is in the scanning position, the leading edge of the photosensitive film contacts the first slider assembly and the second slider assembly. The photosensitive film is tensioned against the curved film platen in alignment between the first slider assembly and the second slider assembly and the feed mechanism, thus removing any skew.

As disclosed in the previous patent, different film sizes are accommodated by a set of a first and second slider block assemblies being provided for each film size handled by the scanner assembly. The slider block assembly sets are spaced along the curved length of the platen since different film lengths wrap around the platen to varying degrees. Although useful for the purposes for which it was intended, this arrangement adds undesirable complexity in that it requires changing slider block assembly locations for each film size.

There is thus a need in an internal drum type laser scanner assembly to provide a system for properly registering multiple film sizes within the drum that is reliable, low in cost and simple in design.

SUMMARY OF THE INVENTION

According to the present invention, there is provided a solution to the problems and need discussed above.

An apparatus for registering film in a drum scanner assembly comprising;

a concave curved film platen having spaced first and second linear edges that are oriented horizontally and third and fourth curved side edges connected between said first and second edges, said concave, curved film platen having a curved surface defining a curved film path having a first downwardly curved position and a second upwardly curved position from said first to said second edges, first and second spaced film engagement assemblies independently and movably mounted relative to said platen at said second portion of said film path, said assemblies having film registration slides for engaging the leading edge of a sheet of film fed onto said concave, curved film platen from said first edge and along said curved film path said slides being mounted for movement over substantially the length of said second portion of said path and being adapted to register films of different lengths; and means associated with said slides for biasing said slides through the force of gravity against said leading edge of said film, wherein as said film is fed along said curved path, said slides are moved upwardly by said film against the force of gravity wherein said film is caused to conform to the curved film platen and wherein said independently mounted slides act to remove skew from said fed film.

ADVANTAGEOUS EFFECT OF THE INVENTION

The invention has the following advantages.
1. Handles multiple film sizes.
2. Precise control of motion of film registration mechanism.
3. Reliability.
4. Ease of assembly.

DETAILED DESCRIPTION OF THE INVENTION

Figure 1:
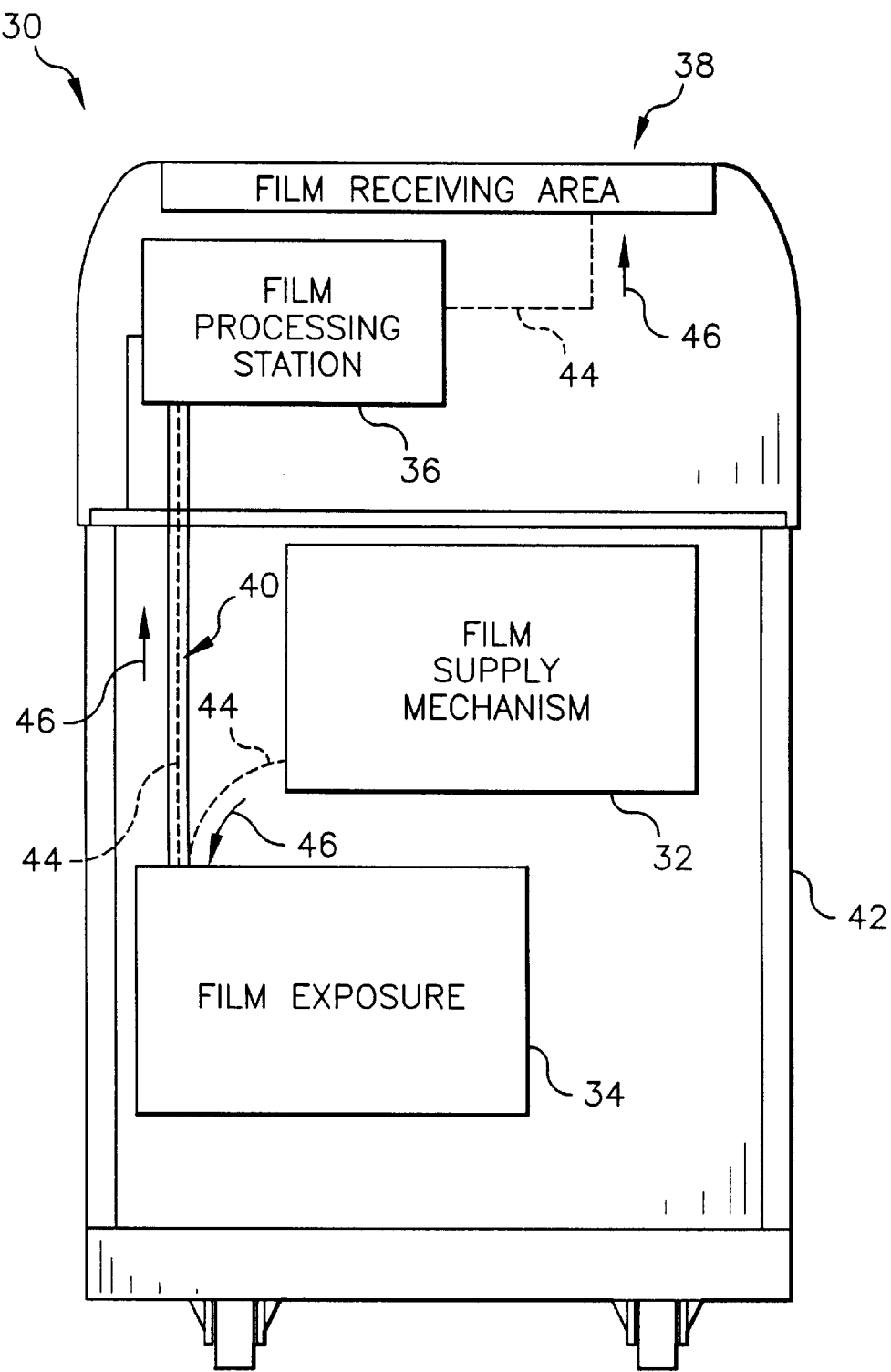
FIG. 1 is a diagrammatic elevational view of a laser imaging apparatus including the present invention.

FIG. 1 is an elevational diagram illustrating an exemplary embodiment of a laser imaging system 30 suitable for use in the medical imaging industry including a film exposure assembly having a mechanism for positioning a photosensitive film into a scanning position on a curved film platen of an internal drum scanner assembly, in accordance with the present invention. The imaging system 30 includes a film supply mechanism 32, a film exposure assembly 34, a film processing station 36, a film receiving area 38, and a film transport system 40. The film supply mechanism 32, film exposure assembly 34, film processing station 36, and film transport system 40 are all located within an imaging system housing 42.

Photosensitive film is stored within the film supply mechanism 32. The film transport system 40 allows the photosensitive film to be moved between the film exposure assembly 34, film processing station 36, and the film receiving area 38. The film transport system 40 may include a roller system (not shown) to aid in transporting the film along a film transport path, indicated by dashed line 44. The direction of film transport along film transport path 44 is indicated by arrows 46. In particular, the film supply mechanism 32 includes a mechanism for feeding a piece of film along film transport path 44 into the film exposure assembly 34 for exposing the desired image on the photosensitive film using a laser or optical scanner assembly. After exposure of the desired image on the photosensitive film, the photosensitive film is moved along the film transport path 44 to the film processing station 36. The film processing station 36 develops the image on the photosensitive film. After film development, the photosensitive film is transported to the film receiving area 38.

The invention has been described in detail with particular reference to certain preferred embodiments thereof, but it will be understood that variations and modifications can be effected within the spirit and scope of the invention.

Figure 2:
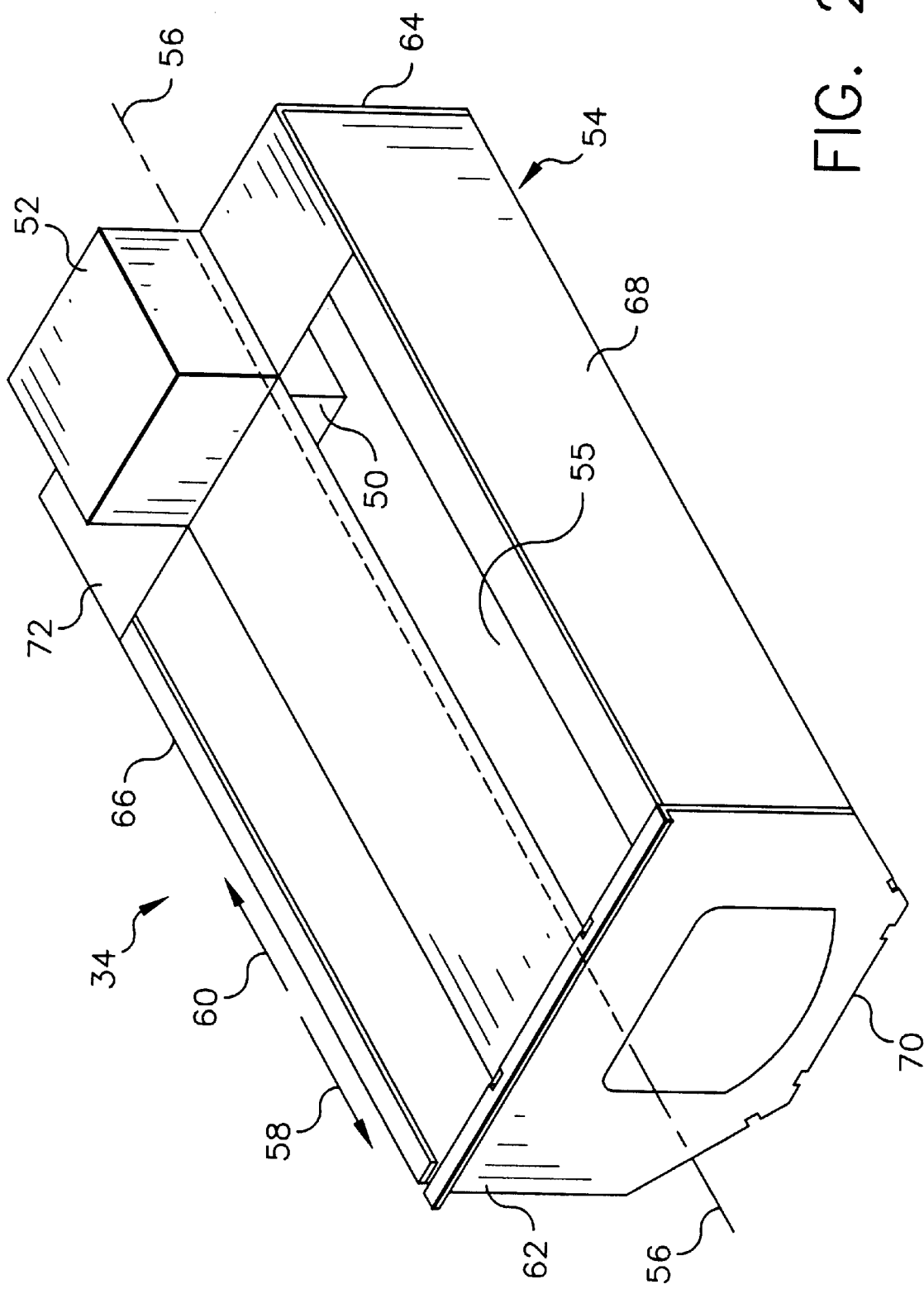
FIG. 2 is a perspective view of an exemplary film exposure assembly incorporating the present invention.

FIG. 2 shows a top perspective view of the film exposure assembly 34 including a mechanism for positioning a photosensitive film into a scanned position in accordance with the present invention. The film exposure assembly 34 has an internal-drum type configuration. The film exposure assembly 34 includes a laser or optical scanner assembly 50 mechanically coupled to a linear translation system 52, mounted within drum frame 54 for exposure of the film. The drum frame 54 includes a concave, curved film platen 55, which can be defined as the internal drum surface. The center of curvature of the curved film platen 55, is coincident with the platen longitudinal axis indicated by dashed line 56. During a scanning process, the optics translation system 52 operates to move the optical scanner assembly 50 along the longitudinal axis 56 (in a direction generally perpendicular to the scanning direction), indicated by directional arrow 58, and after scanning, returns the optical scanner assembly 50 to a start position, along the longitudinal axis 56, indicated by directional arrow 60.

Drum frame 54 is constructed of metal, and includes a first end 62, a second end 64, a first side 66, a second side 68, a bottom 70, and a top 72. Film platen 55 is positioned within the drum frame 54. Film platen 55 provides a cylindrical or partially cylindrically-shaped scanning surface.

The linear translation system 52 positions the optical scanner assembly 50 along the center of curvature (of a piece of film in scanning position on the film platen), coincident with longitudinal axis 56. In particular, the linear translation system 52 is positioned between the first end 62 and the second end 64.

Figure 3:
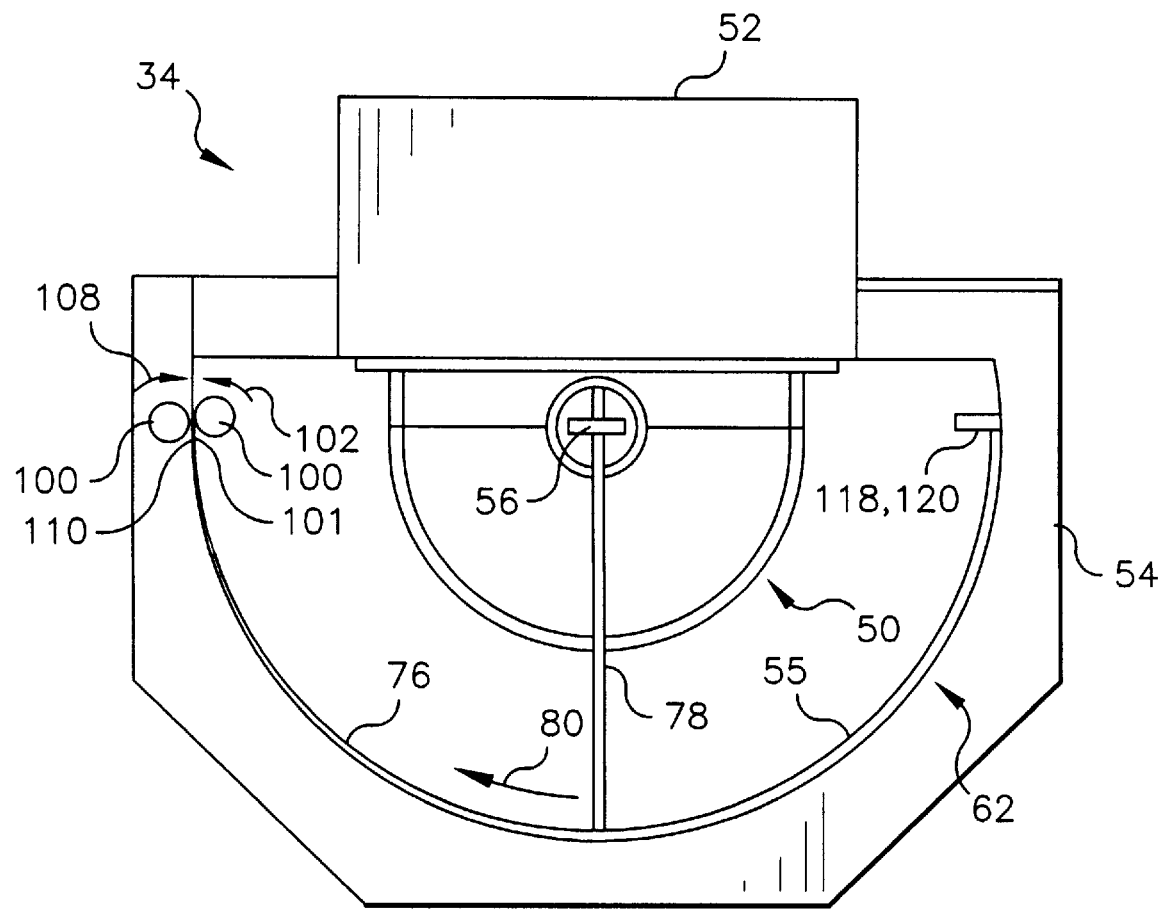
FIG. 3 is an end view of the film exposure assembly shown in FIG. 2.

Referring to FIG. 3, an end elevational view of the film exposure assembly 34 is shown, having a portion of the drum frame 54 removed for clarity. Laser or optical scanner assembly 50 is shown mechanically coupled to the linear translation system 52, positioned along the center of curvature 56.

A piece of photosensitive film 76 is shown positioned on the concave, curved film platen 55. During exposure of the photosensitive film 76, the photosensitive film 76 is held against the film platen 55 in a scanning position. In a scanning position the photosensitive film 76 assumes the shape of the curved film platen 55, which has a cylindrical, partial cylindrical, or drum shape. The photosensitive film 76 is positioned in a scanning position (i.e., aligned and centered) using the film positioning mechanism in accordance with the present invention.

In the scanning position, the photosensitive film 76 is aligned (skew removed), centered and held against the film platen 55. The film is aligned when the leading and trailing edges of film 76 are parallel to longitudinal axis 56. The optical scanner assembly 50 scans a laser beam representative of an image to be exposed on the film, across the film scanning surface in an image-wise pattern. In particular, the scanning laser beam (indicated at 78) emanates radially from the center of curvature 56 of the film platen 55 and film 76, which is located along the center of curvature of longitudinal axis 56. The optical scanner assembly 50 scans the laser beam containing image data representative of the image to be exposed in raster lines by rotating about the longitudinal axis 56 of the cylinder drum (indicated by directional arrow 80). As the optical scanner assembly 50 scans the image and raster lines in an image-wise pattern across the photosensitive film 76 located on the internal surface of platen 55, the linear translation system 52 moves the optical scanner assembly 50 along the center of curvature longitudinal axis 56 to expose a full image on the photosensitive film. The linear translation system 52 moves the optical scanner assembly 50 along the longitudinal axis 56 in a direction which is generally perpendicular to the scanning direction of laser beam 78. Since the linear translation system 52 moves the optical scanner assembly 50 during each scan line, the resulting scan lines may not be perpendicular, but are "generally" perpendicular to the direction of movement of the linear translation system.

In one exemplary embodiment, the film exposure area on the internal film platen surface is 17 inches by 14 inches, suitable for exposure of a 17 inch by 14 inch piece of photosensitive film. In the exemplary embodiment disclosed herein, the film is exposed in a vertical direction. In particular, since the film is fed into the exposure module in the 14 inch direction and subsequently scanned in the 17 inch direction, the scanned raster lines appear in the vertical direction. The laser beam is scanned 180° (or greater than 180°) across the internal drum surface, for exposure of 17 inches across the photosensitive film. The linear translation system moves the optical scanner assembly along the longitudinal axis located at the center of curvature of the internal film platen surface to cause fall exposure of a desired image/images on the photosensitive The photosensitive film can be a photosensitive film which is sensitive to laser beam light. The film can be a light sensitive photothermographic film having a polymer or paper base coated with an emulsion of dry silver or other heat sensitive material. The photosensitive film can also be any other type of film, such as wet processed photosensitive film.

A mechanism in accordance with the present invention for positioning a piece of photosensitive film into a scanning position on a curved film platen of an internal drum scanner assembly will be described in detail in the following paragraphs. The mechanism aligns the photosensitive film, while holding or compressing the photosensitive film against the curved film platen in the scanning position, allowing an image to be precisely exposed on the photosensitive film.

Figure 6:
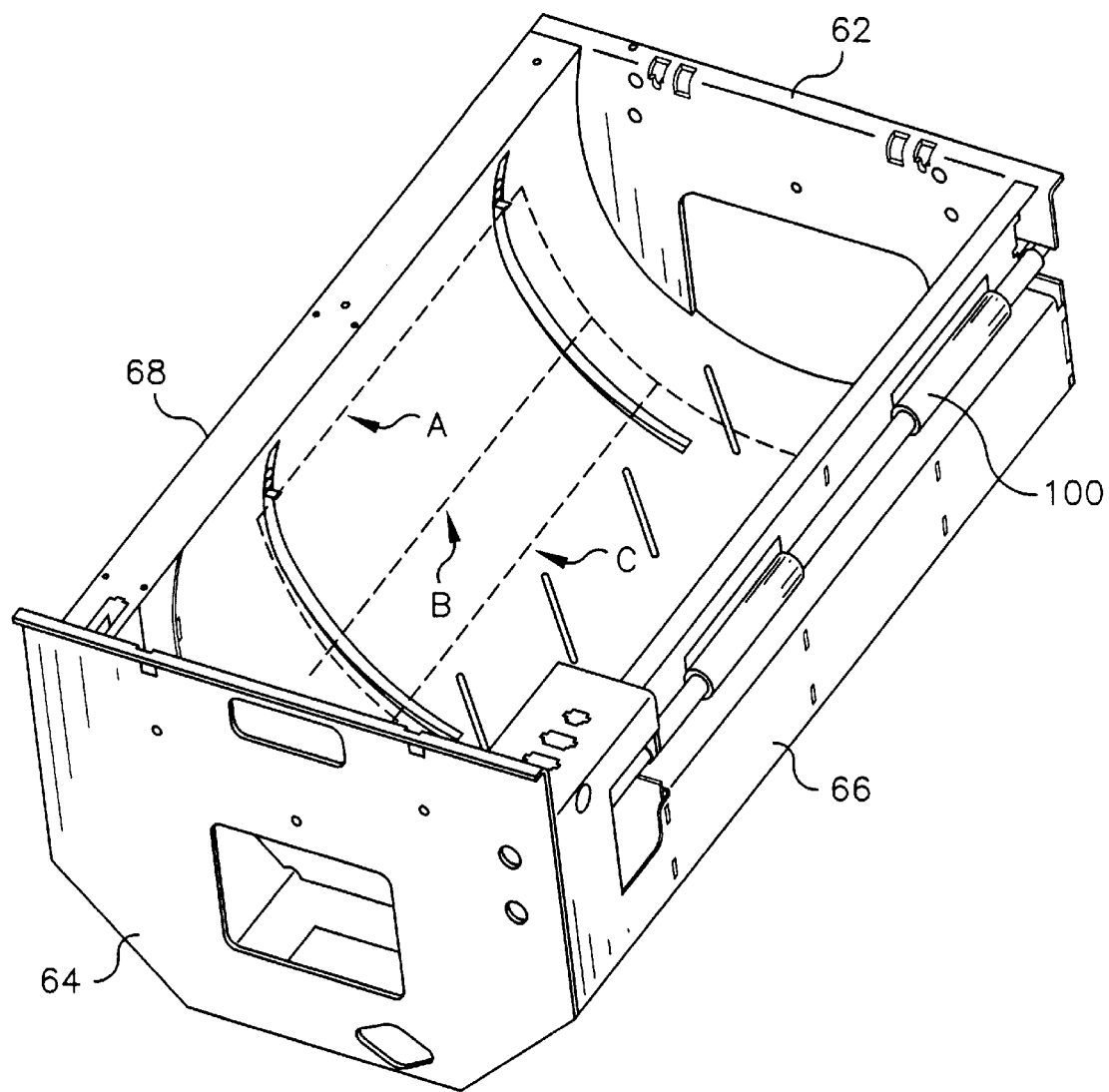
Figure 7:
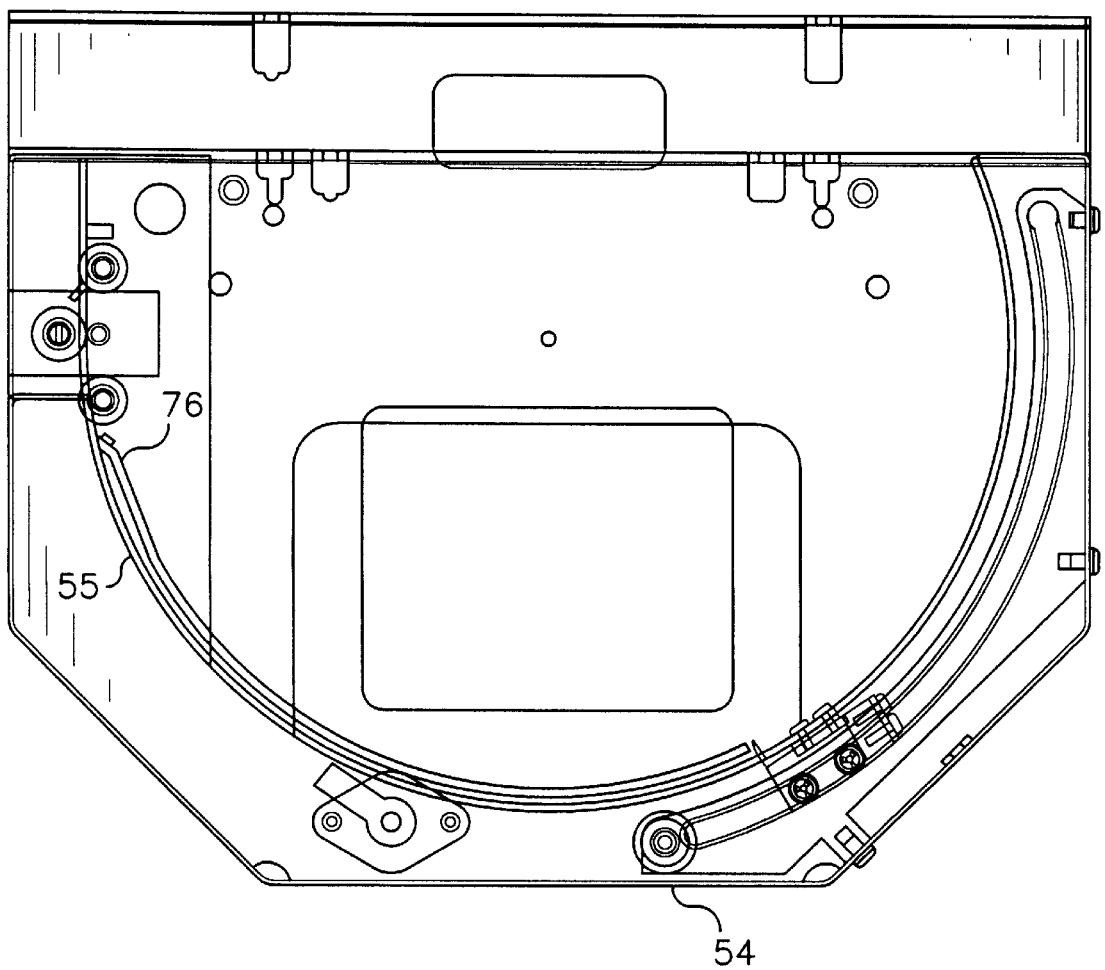
Figure 8:
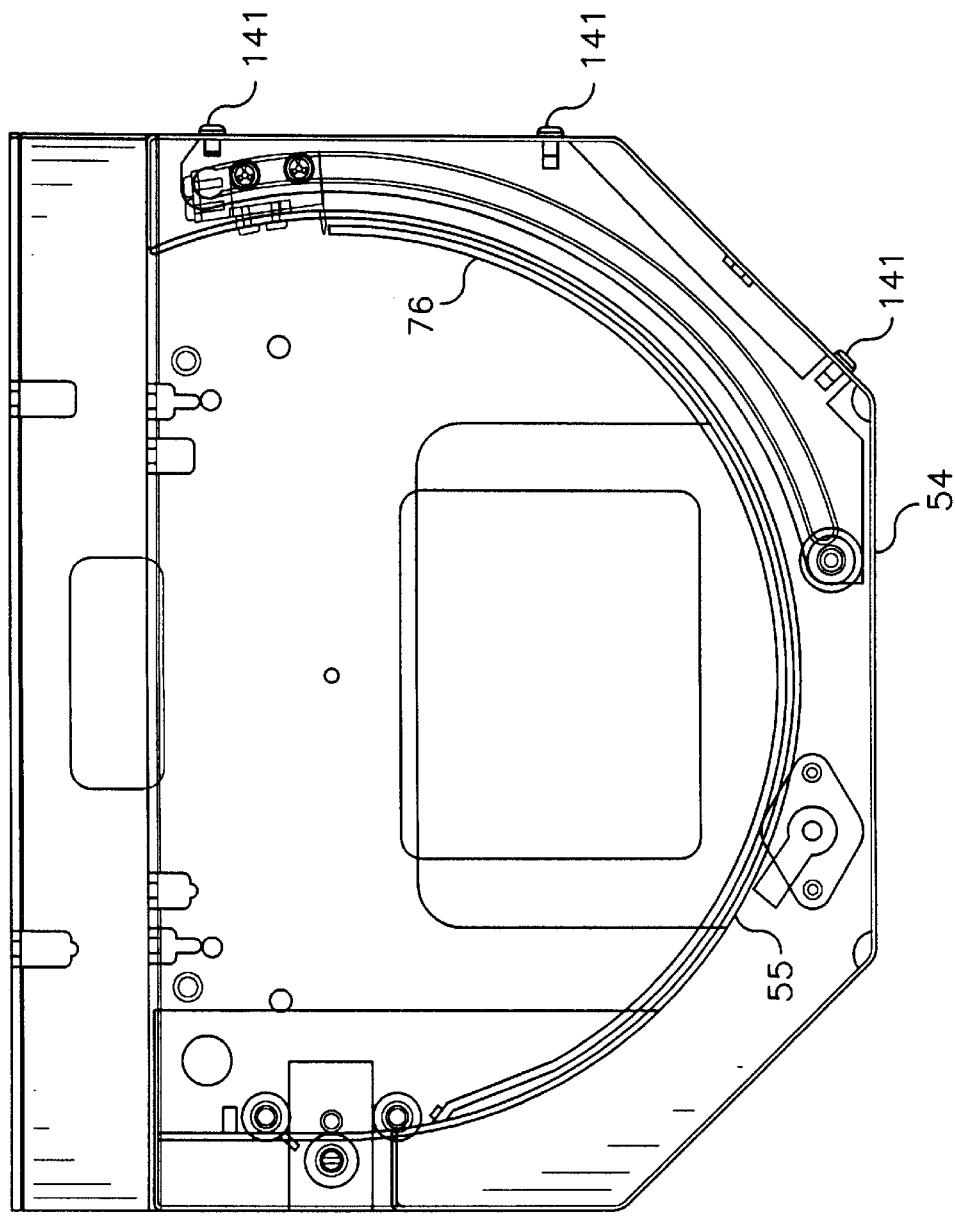
Figure 9:
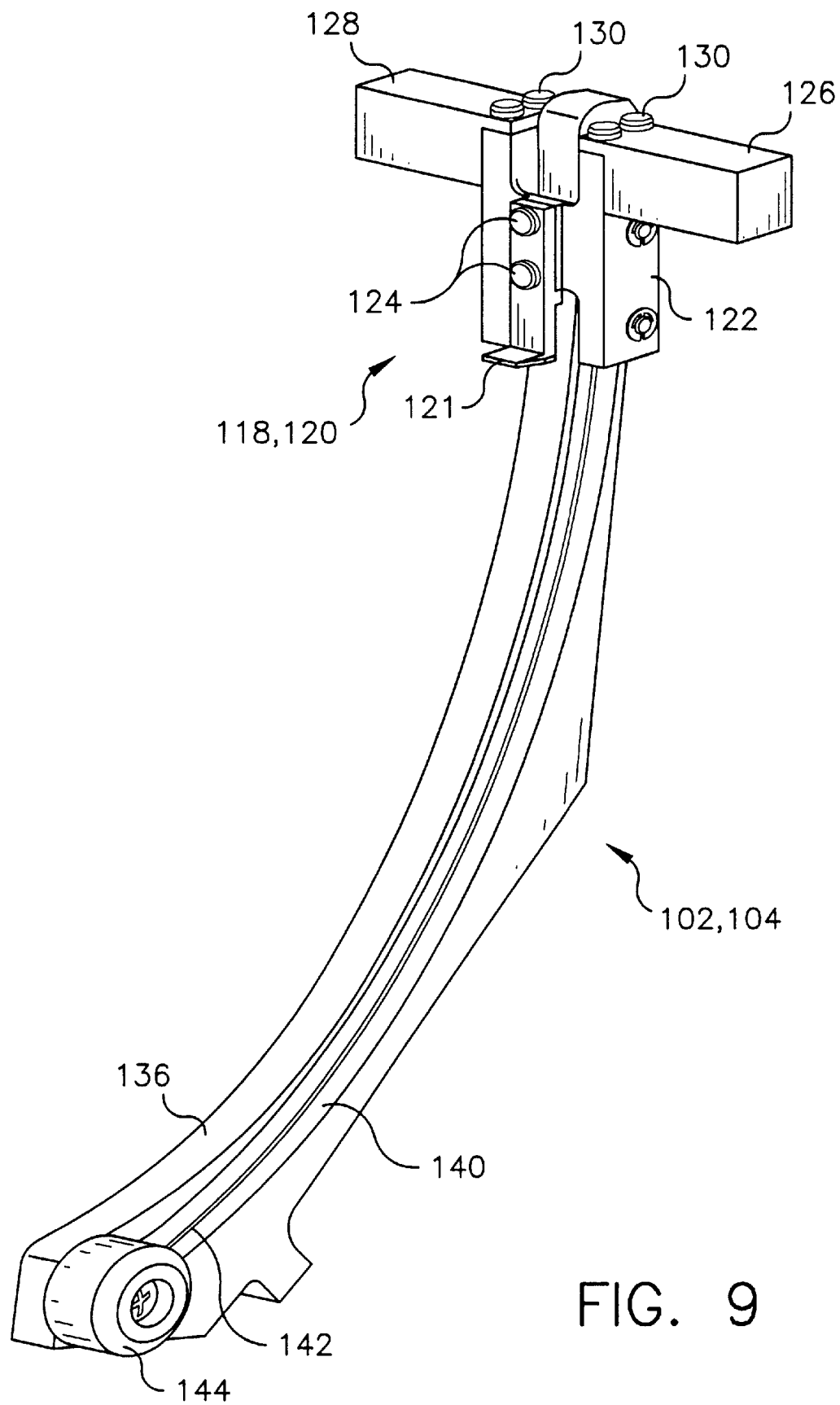
Figure 10:
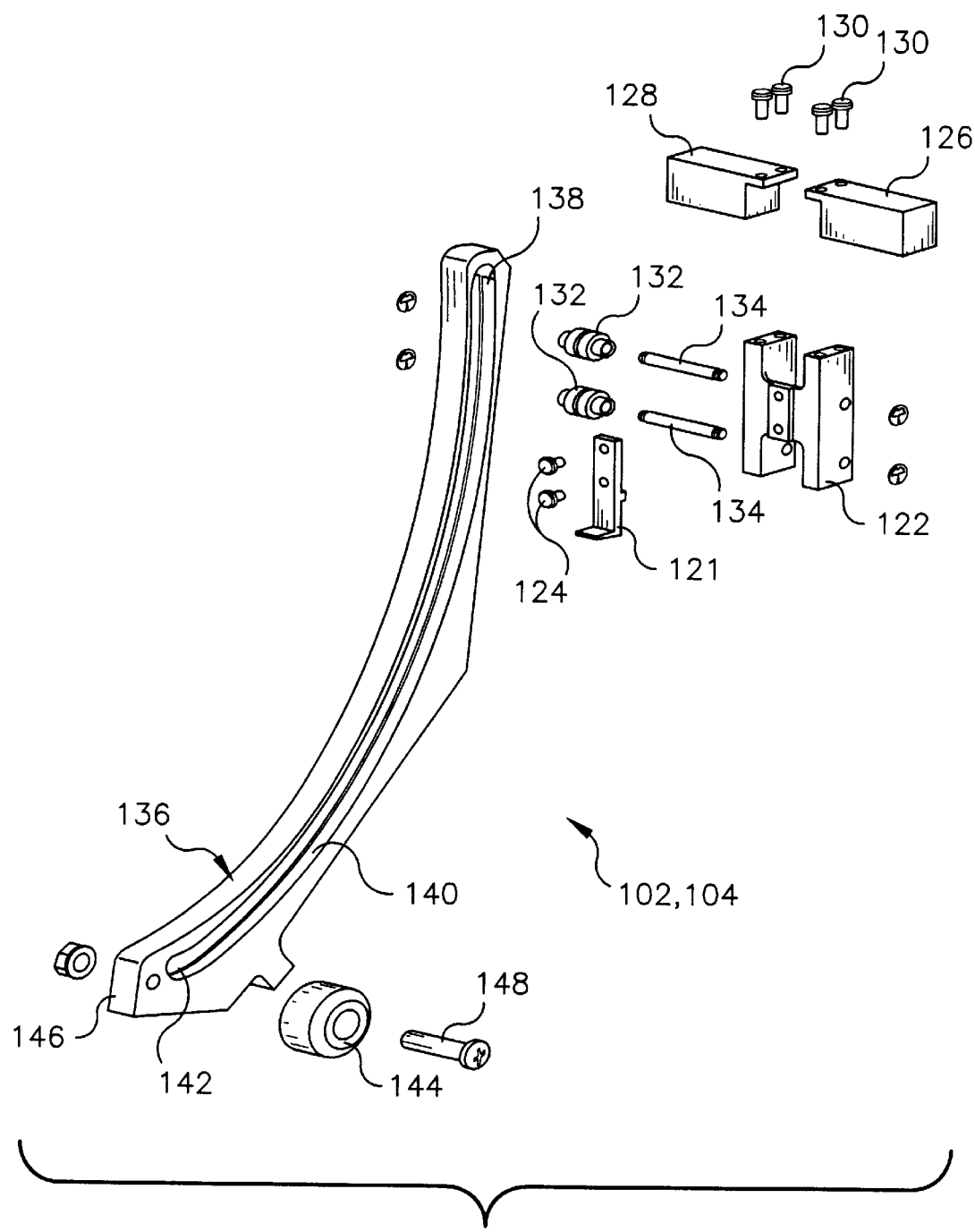
Figure 11:
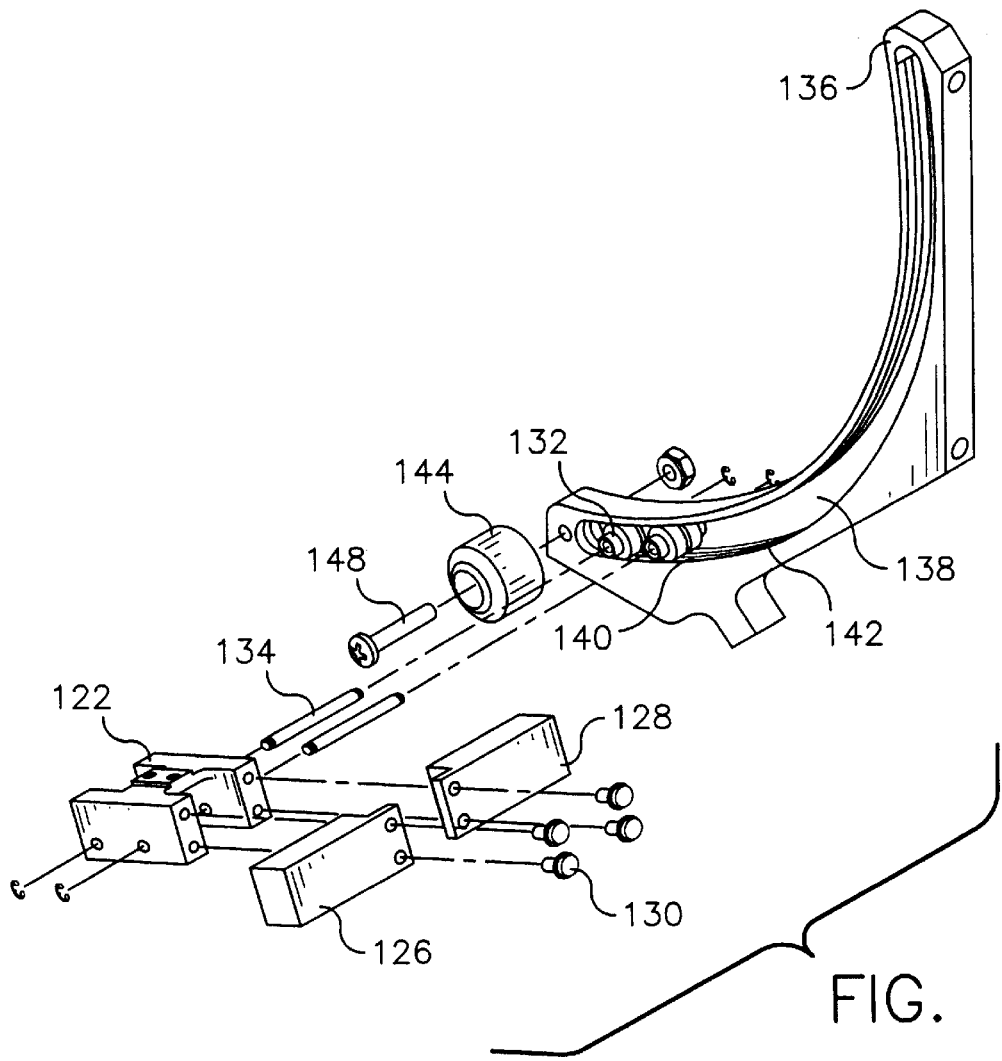

Referring now to FIGS. 3–12, there is shown an embodiment of the present invention shown, feed rollers 100 feed a sheet of photosensitive film 76 onto concave, curved platen 55, where the leading edge engages spaced film registration slides 118 and 120 at the bottom of platen 55 (FIGS. 5 and 7) As shown in FIGS. 6 and 8, film 76 has pushed film registration slides 118 and 120 to near the top of platen 55. At this point, as shown in FIGS. 3 the trailing edge of film 76 has cleared rollers 100 rotating in directions 106, 108. Registration slides 118, 120 act to force film 76 back against feed rollers 100, at 110, thereby squaring it off as the entire length of the trailing edge 101 is now in contact with rollers 100, thus eliminating any skew.

As shown more clearly in FIGS. 9–12, each of film engagement assemblies 102, 104 includes a film registration slide 118,120 including a lip 121 mounted on body 122 by fasteners 124. Weights 126, 128 are fastened to body 122 by fasteners 130. Grooved wheels 132 are rotatably mounted on body 122 by shafts 134. Slides 118, 120 ride in curved tracks 136 mounted beneath platen 55. Track 136 includes a curved slot 138 having a rail 140 with a ridge 142, which projects into the grooves of wheels 132 and (not shown) an upper rail with a ridge which projects into the grooves of wheels 132. Tracks 136 are mounted on drum frame 54 by fasteners 141 (FIG. 8).

Figure 4:
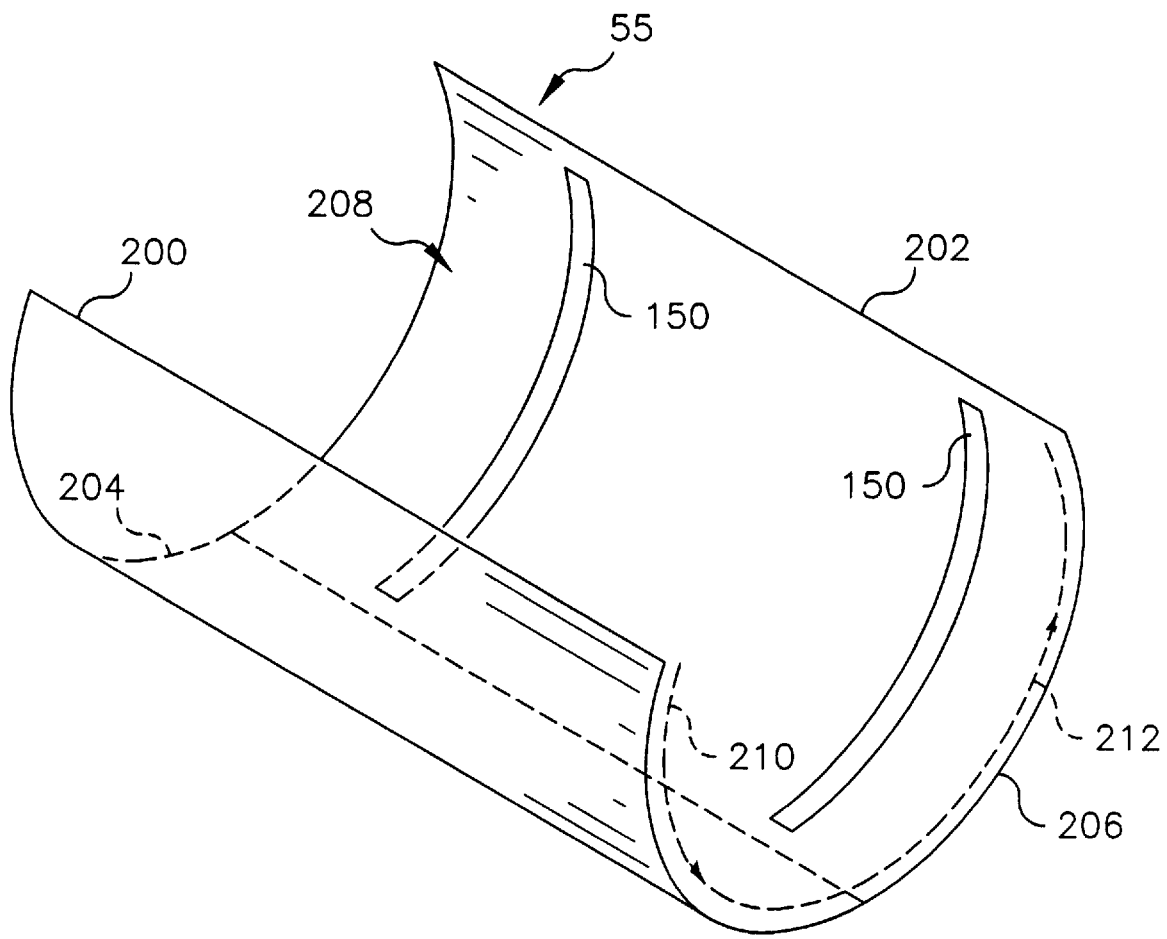
FIG. 4 is a diagrammatic view illustrating a feature of the present invention.
Figure 5:
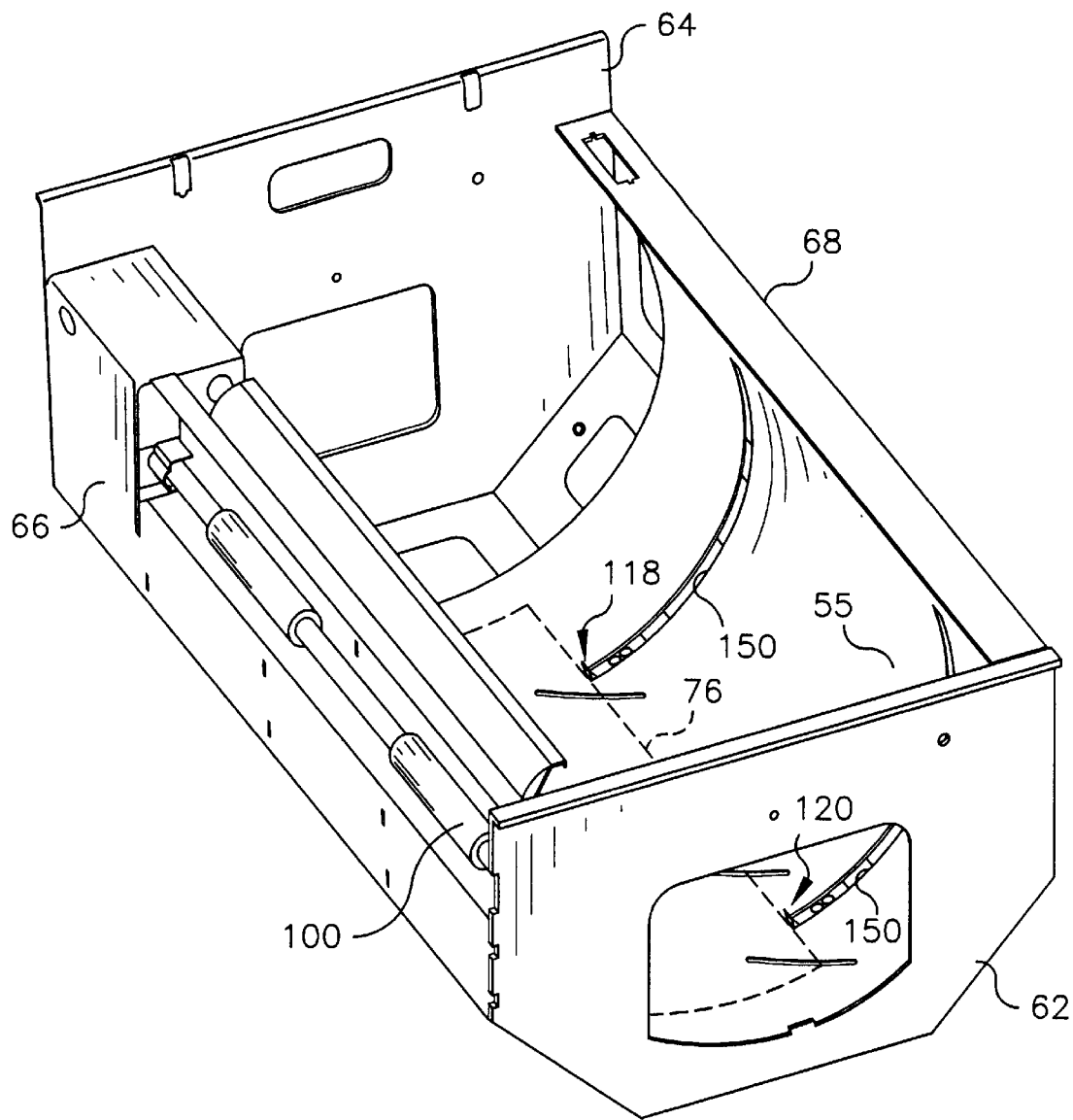
FIGS. 5–12 are diagrammatic views illustrating an embodiment of the present invention.

Concave, curved film platen 55, shown in FIG. 4 has spaced first and second linear edges 200, 202 that are oriented horizontally and third and fourth curved edges 204, 206 connected between first and second edges 200, 202. Concave, curved film platen 55 has an inner curved surface 208 defining a curved film path from said first edge 200 to second edge 202 having a first downwardly curved portion 210 and a second upwardly curved portion 212. Platen 55 includes arcuate 150 at the second path portion 212.

Figure 12:
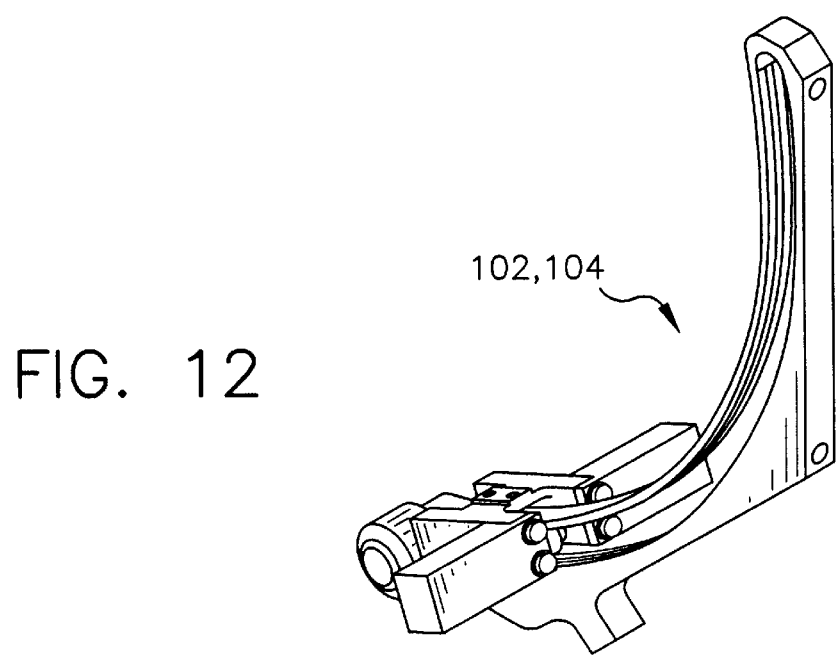
Figure 13:
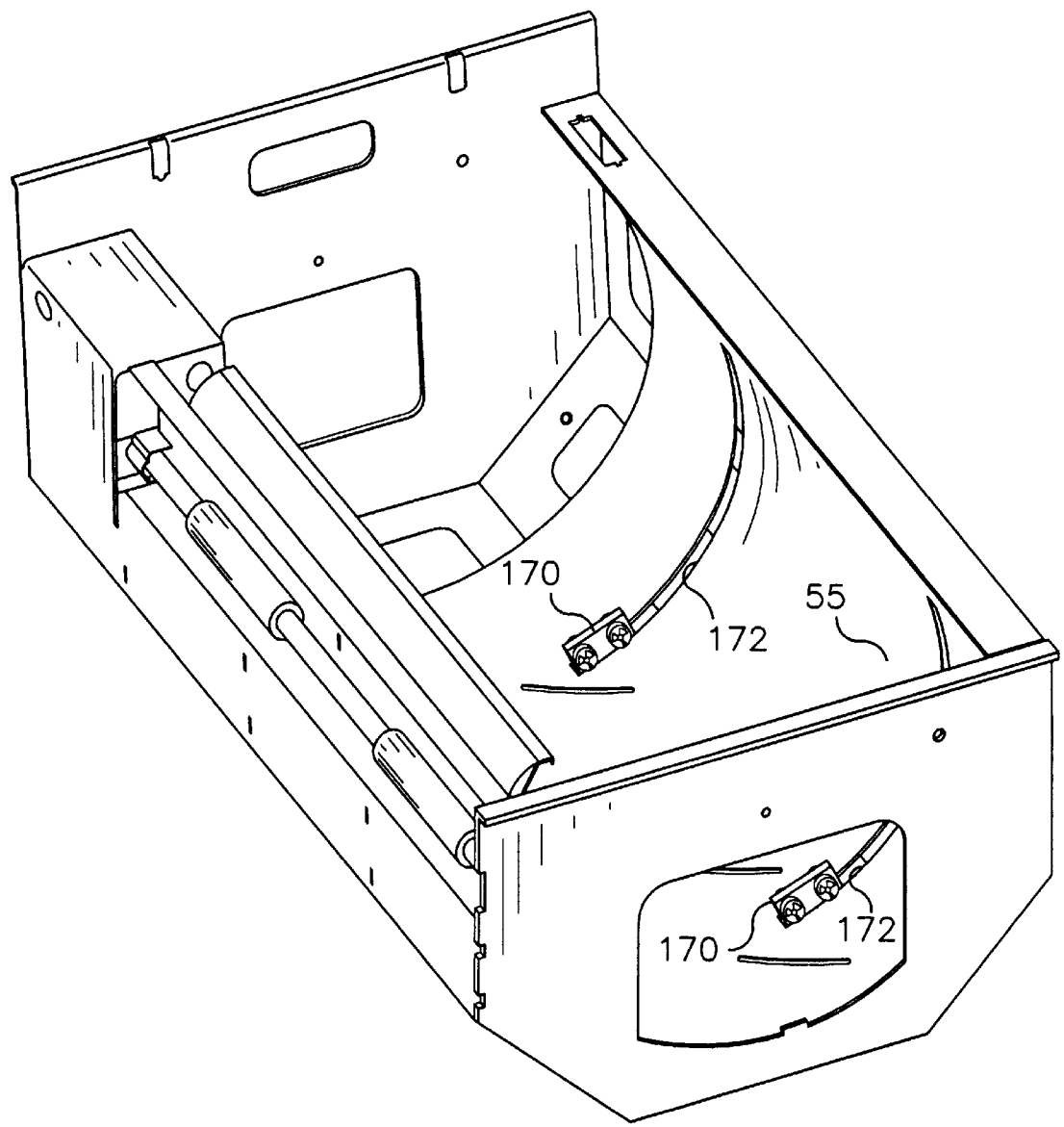
FIGS. 13–16 are diagrammatic views illustrating another embodiment of the present invention.
Figure 14:
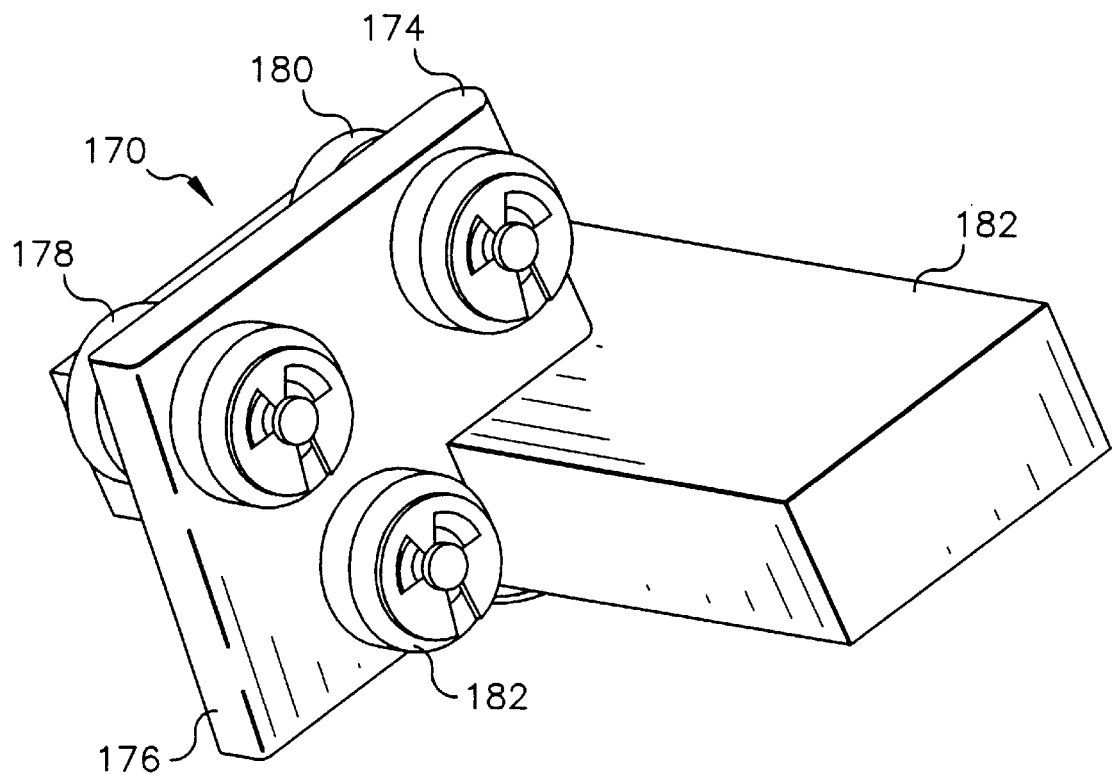
Figure 15:
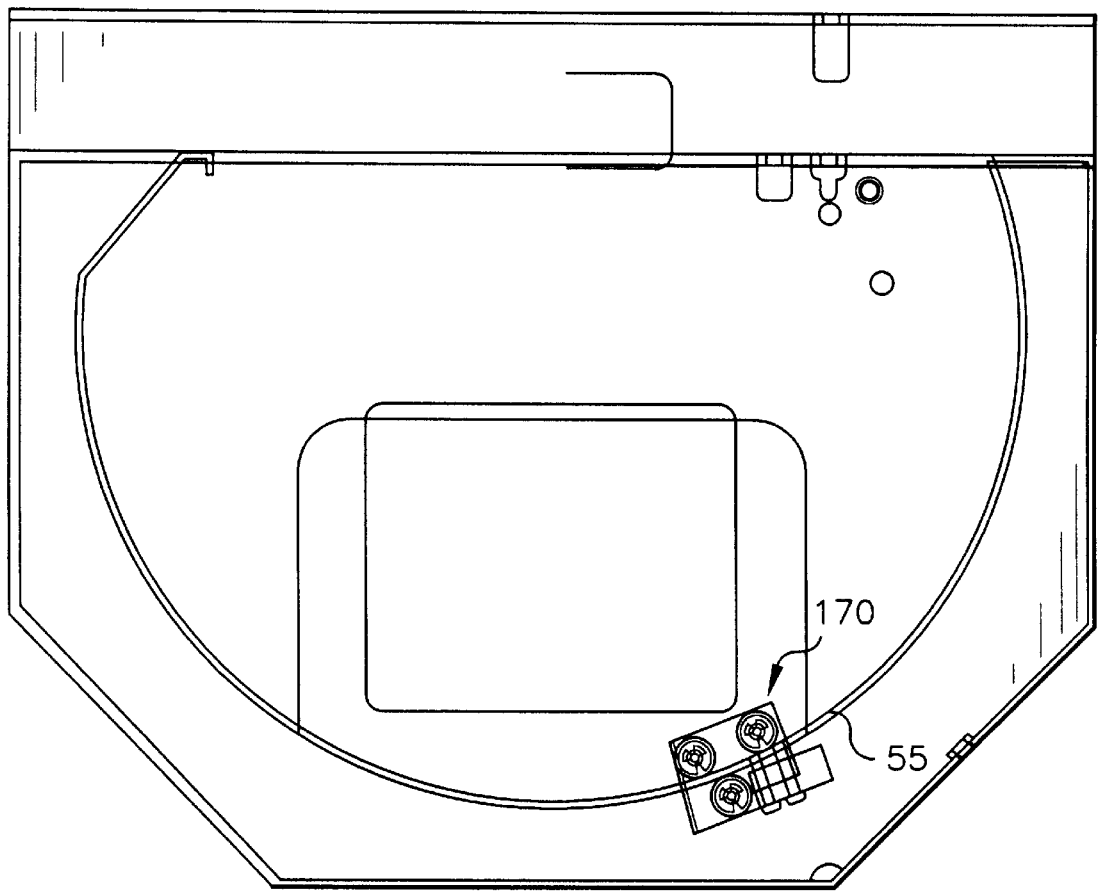
Figure 16:
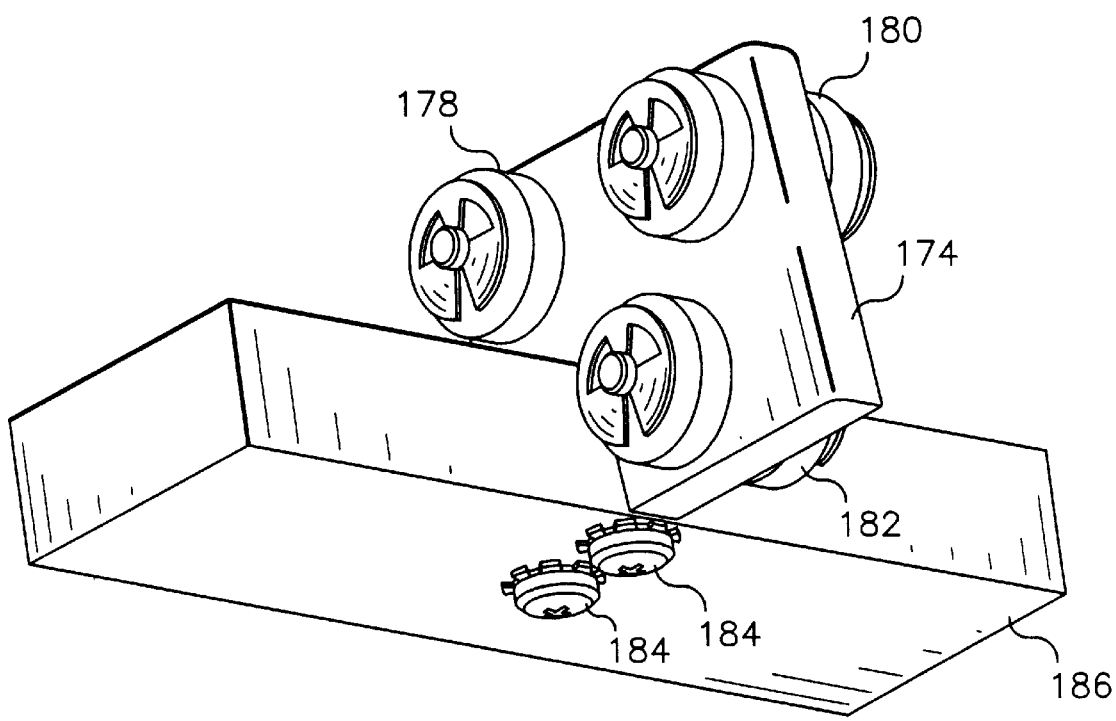

A roller bumper 144 is mounted at the lower end 146 of track 136 by means of screw 148. As shown in FIG. 12, one side of body 122 engages bumper 144 when slide 118, 120 is at rest at the lower end of track 136.

Film engagement assemblies 102, 104 operate as follows. The film registration slides 118, 120 is at rest in engagement with bumper 144 due to the force of gravity on weights 126, 128. As film 76 is fed onto platen 55, it wraps around platen 55 and engages lips 121 of film registration slide 118, 120 protruding through arcuate slots 150 in platen 55. The beam strength of film 76 allows it to push the slides 118,120 up tracks 136 while the weight of slides 118,120 holds film 76 flat against the imaging surface of platen 55. Tracks 136 are machined to be concentric with platen 55 so that as film 76 pushes against slides 118, 120 there is no relative motion between the film engagement assembly lip 121 and the film 76. This prevents the leading edge of film 76 from lifting up off the platen 55, which could cause the image at that location to be out of focus. As film 76 is fed, it pushes slides 118, 120 ahead of it.

Figure 18:
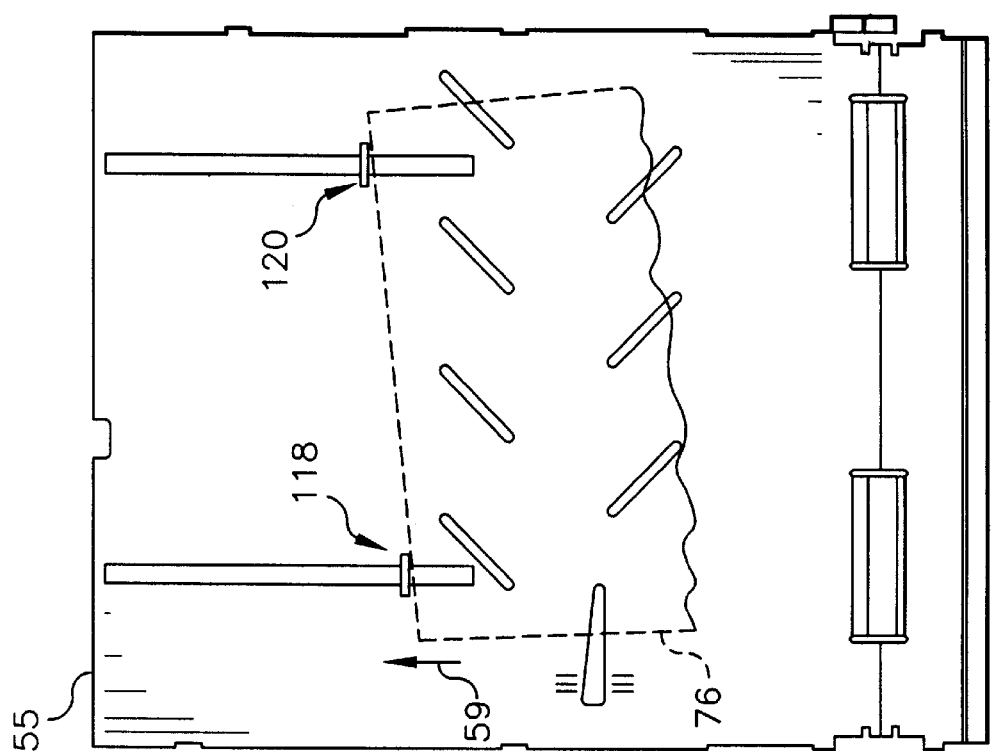
FIGS. 17–20 are diagrammatic views illustrating the film registration feature of the present invention.
Figure 17:
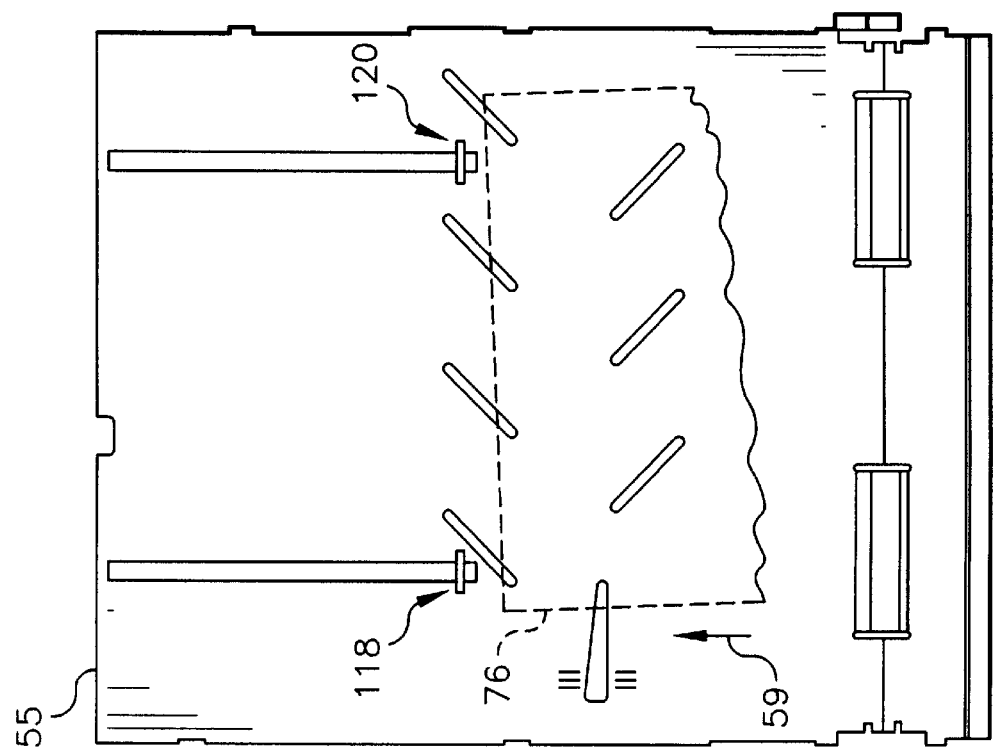
Figure 20:
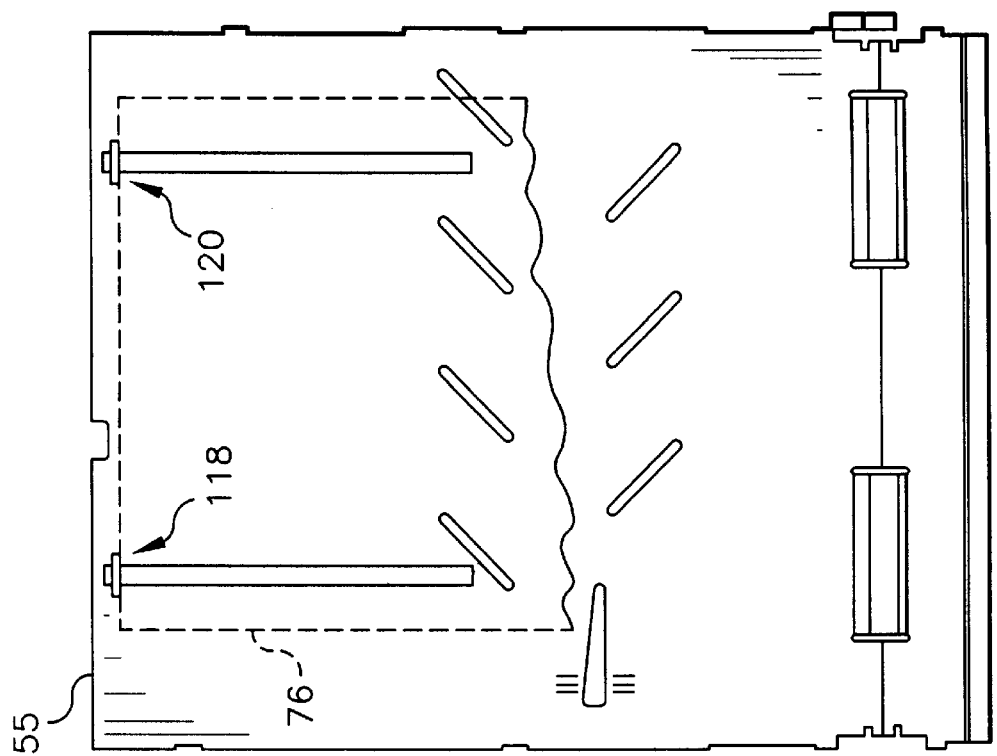
Figure 19:
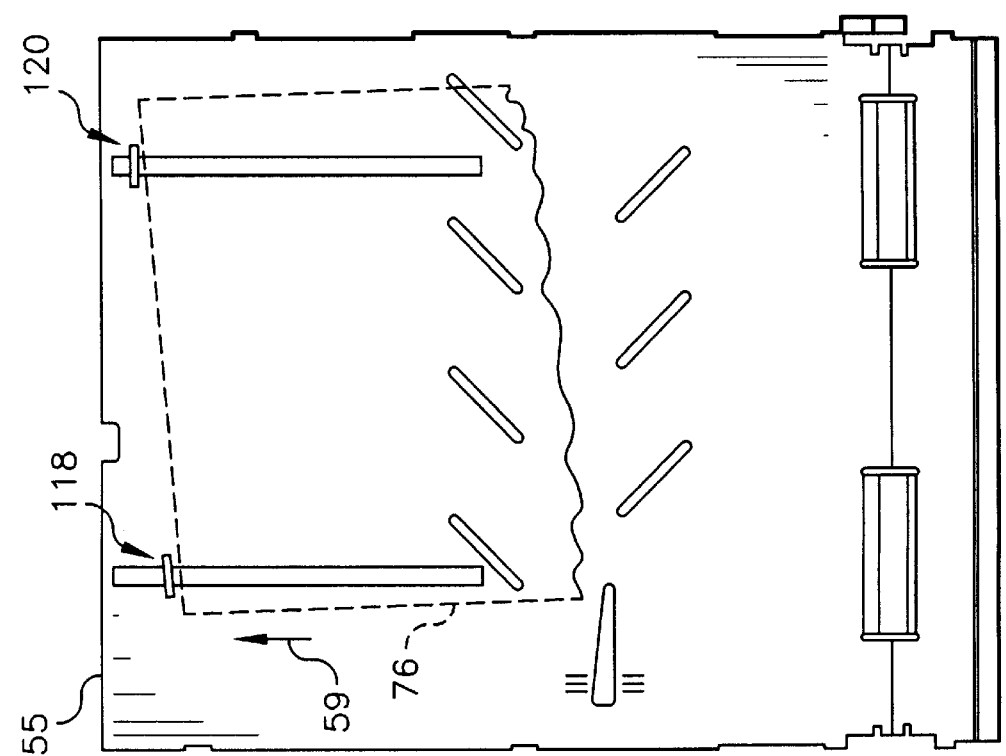

If film 76 is skewed as it is fed onto platen 55 by rollers 100, one of slides 118, 120 will travel further in its track than the other until the trailing edge of film 76 reaches rollers 100 (see FIG. 4). This is illustrated in FIGS. 17–20. In FIG. 17, film 76 is skewed as it moves around platen 55 in the direction of arrow 59. In FIG. 18, film 76 is engaged by slides 118, 120. As the trailing edge of the film 76 leaves rollers 100, slides 118, 120 remove the skew from film 76 (FIG. 19) until in FIG. 20, film 76 is properly registered on platen 55. This independent action of slides 118, 120 is important in facilitating the removal of any skew from film 76 as it is loaded onto platen 55.

In the current embodiment, the slides can operate over a range of nearly ninety degrees in the drum, allowing for multiple film lengths. The range of film sizes the slides can accommodate depends on the radius of the drum. For the system being described, the range of force imparted to the film lies between 0.1 and 0.6 pounds of force per slide mechanism. Because the angle of the film changes with respect to the weights as it wraps around the drum surface, it should be noted that the weights provide a different retaining force to the film for each separate film length. It is important to note the system must sufficiently overcome the friction between the film and the drum surface in order to register the film against the feed rollers.

As disclosed in U.S. Pat. No. 5,956,071, a centering mechanism can be provided to center film 76 on platen 55.

As shown in FIGS. 6 and 8, the longest length of film 76 has been fed onto platen 50, and slides 118, 120 have been pushed to the ends of tracks 136 at position A. According to the present invention, different length films can be accommodated by slides 118, 120. In such case, slides 118, 120 would travel a smaller distance up tracks 136. In an exemplary laser printer, several sizes of film can be imaged such as 14"×17", 14"×14 and 14"×11". Since the film registration slides 118, 120 of assemblies 102, 104, can travel an angle of about 90° along track 136 from the at-rest position, the longest film pushes slides up an arc of about 90°, the intermediate length film pushes slides 118, 120 up an intermediate arc (such as to position B in FIG. 6) and the shortest length film pushes slides up the smallest arc (such as to position C in FIG. 6). However, the weight of slides 118, 120 keep film 76 flat on platen 55 irrespective of the length of film 76.

Referring now to FIGS. 13–16, there is shown another embodiment of the present invention. As shown, film registration slides 170 ride directly on platen 55 in slots 172 in platen 55. As shown more clearly in FIGS. 14 and 16, film registration slides 170 include a body 174 having a front surface 176 for engaging the leading edge of film 76. Body 174 rotatably mounts upper wheel sets 178, 180 and lower wheel set 182. Weight 186 is mounted on the bottom of body 174 by means of fasteners 184.

Slides 170 operate independently of each other and function in the same manner as slides 118, 120 in registering film 76 on platen 55.

| PARTS LIST | |
|---|---|
| 30 | laser imaging system |
| 32 | film supply mechanism |
| 34 | film exposure assembly |
| 36 | film processing station |
| 38 | film receiving area |
| 40 | film transport system |
| 42 | imaging system housing |
| 44,46 | film transport path |
| 50 | optical scanner assembly |
| 52 | linear translation system |
| 54 | drum frame |
| 55 | curved film platen |
| 56 | drum longitudinal |
| 58 | scanning direction |
| 59 | direction arrow |
| 60 | directional arrow |
| 62 | first end |
| 64 | second end |
| 66 | first side |
| 68 | second side |
| 70 | bottom |
| 72 | top |
| 76 | photosensitive film |
| 78 | scanning laser beam |
| 80 | directional arrow |
| 100 | feed rollers |
| 101 | trailing edge |
| 102,104 | film engagement assemblies |
| 106,108 | direction of rotation |
| 118,120 | film registration slides |
| 121 | film engagement assembly lip |
| 122 | body |
| 124,130 | fasteners |
| 126,128 | weights |
| 132 | split wheels |
| 134 | shafts |
| 136 | track |
| 138 | curved plot |
| 140 | rail |
| 142 | rail ridge |
| 144 | roller bumper |
| 146 | lower end |
| 148 | screw |
| 150 | arcuate slots |
| 170 | film registration slides |
| 172 | film slots |
| 174 | film registration slide body |
| 176 | front surface |
| 178,180 | upper wheel sets |
| 182 | lower wheel set |
| 184 | fasteners |
| 186 | weights |
| 200,202 | platen linear edges |
| 204,206 | platen curved edges |

-continued

| PARTS LIST | |
|---|---|
| 208 | inner curved surface |
| 210 | downwardly curved position |
| 212 | upwardly curved position |

What is claimed is:

1. An apparatus for registering film in a drum scanner assembly comprising;

a concave curved film platen having spaced first and second linear edges that are oriented horizontally and third and fourth curved side edges connected between said first and second edges, said concave, curved film platen having a curved surface defining a curved film path having a first downwardly curved position and a second upwardly curved position from said first to said second edges, first and second spaced film engagement assemblies independently and movably mounted relative to said platen at said second portion of said film path, said assemblies having film registration slides for engaging the leading edge of a sheet of film fed onto said concave, curved film platen from said first edge and along said curved film path said slides being mounted for movement over substantially the length of said second portion of said path and being adapted to register films of different lengths; and means associated with said slides for biasing said slides through the force of gravity against said leading edge of said film, wherein as said film is fed along said curved path, said slides are moved upwardly by said film against the force of gravity wherein said film is caused to conform to the curved film platen and wherein said independently mounted slides act to remove skew from said fed film.

2. The apparatus of claim 1 wherein said platen includes first and second spaced slots and said film registration slides have elements extending through said slots to engage the leading edge of film fed onto said film platen.

3. The apparatus of claim 2 wherein said assemblies include curved tracks mounted below said curved platen and concentric therewith and wherein said film registration slides are movably mounted on said tracks.

4. The apparatus of claim 3 wherein said tracks include elongated curved slots and wherein said film registration slides include one or more rotatably mounted wheels which ride in said slots of said tracks.

5. The apparatus of claim 4 wherein said wheels are grooved and said slots have ridges projecting into said grooves to maintain said film registration slides in said tracks.

6. The apparatus of claim 1 wherein said biasing means include weights which bias said slides downwardly through the force of gravity .

7. The apparatus of claim 6 including bumpers associated with said tracks for limiting the downward movement of said film slides.

8. The apparatus of claim 1 wherein said slides are slidably mounted to ride directly on said platen and include film engaging surfaces.

9. The apparatus of claim 8 wherein said platen includes first and second spaced slots in said platen and wherein said slides include wheel sets contacting said platen above and below said platen and adapted to ride on said platen.

* * * * *